United States Patent
Itoh

(10) Patent No.: US 9,319,106 B2
(45) Date of Patent: Apr. 19, 2016

(54) COMMUNICATING WITH NEAR FIELD COMMUNICATION DEVICE IN STOPPED STATE

(71) Applicant: Lenovo (Singapore) Pte. Ltd., Singapore (SG)

(72) Inventor: Hiroshi Itoh, Kanagawa-ken (JP)

( * ) Notice: Subject to any disclaimer, the term of this patent is extended or adjusted under 35 U.S.C. 154(b) by 160 days.

(21) Appl. No.: 14/036,099

(22) Filed: Sep. 25, 2013

(65) Prior Publication Data

US 2014/0087662 A1    Mar. 27, 2014

(30) Foreign Application Priority Data

Sep. 26, 2012  (JP) ................. 2012-211673

(51) Int. Cl.
| | | |
|---|---|---|
| H04W 52/02 | (2009.01) | |
| H04B 5/00 | (2006.01) | |
| H04W 4/00 | (2009.01) | |

(52) U.S. Cl.
CPC ............. *H04B 5/0031* (2013.01); *H04W 4/008* (2013.01); *H04M 2250/04* (2013.01); *H04W 52/0251* (2013.01)

(58) Field of Classification Search
CPC ... H04B 5/0025; H04B 5/0031; H04W 52/02; H04W 52/0235; Y02B 70/3233
See application file for complete search history.

(56) References Cited

U.S. PATENT DOCUMENTS

| | | | | |
|---|---|---|---|---|
| 2008/0219196 | A1* | 9/2008 | Ptasinski | 370/311 |
| 2009/0065572 | A1* | 3/2009 | Jain | 235/379 |
| 2009/0122788 | A1* | 5/2009 | Ito | H04L 12/66 370/352 |
| 2009/0221240 | A1* | 9/2009 | Zhang | G06K 7/0008 455/68 |
| 2011/0207405 | A1* | 8/2011 | Minemura et al. | 455/41.2 |
| 2012/0040610 | A1* | 2/2012 | Moosavi et al. | 455/41.1 |
| 2012/0178367 | A1* | 7/2012 | Matsumoto | G06K 19/0707 455/41.1 |
| 2012/0231734 | A1* | 9/2012 | Symons | H04B 5/0075 455/41.1 |
| 2012/0309302 | A1* | 12/2012 | Buhot | H04B 5/00 455/41.1 |
| 2012/0329389 | A1* | 12/2012 | Royston | H04B 5/0062 455/41.1 |

FOREIGN PATENT DOCUMENTS

| | | |
|---|---|---|
| JP | 2003174382 A | 6/2003 |
| JP | 2004289253 A | 10/2004 |
| JP | 2007166191 A | 6/2007 |
| JP | 2007323362 A | 12/2007 |
| JP | 2008252212 A | 10/2008 |
| JP | 2012182609 A | 9/2012 |

* cited by examiner

*Primary Examiner* — Andrew Wendell
(74) *Attorney, Agent, or Firm* — Ference & Associates LLC

(57) ABSTRACT

An embodiment provides a method, including: initiating communication between a first communication device with a first near field communication device and a second communication device with a second near field communication device, wherein said second near field communication device is in a stopped state comprising; receiving a request from said first communication device at said second communication device; after receiving the request, shifting said second near field communication device to an operational state; receiving other information from said first near field communication device at said second near field communication device; ending communication between said first near field communication and said second near field communication device; and shifting said second near field communication device to a stopped state. Other embodiments are described and claimed.

18 Claims, 4 Drawing Sheets

COMMUNICATING WITH NEAR FIELD COMMUNICATION DEVICE IN STOPPED STATE

CLAIM FOR PRIORITY

This application claims priority from Japanese Patent Application No. 2012-211673, filed on Sep. 26, 2012, and which is fully incorporated by reference as if fully set forth herein.

FIELD

The subject matter described herein relates to a technique of communicating with a near field communication device in a stopped state mounted on an information terminal device and a technique of acquiring an IP address of an information terminal device through a near field communication device.

BACKGROUND

In some cases, a notebook personal computer (laptop PC) is equipped with a device compliant with near field communication (NFC) standards such as radio frequency identification (RFID), BLUETOOTH®, infrared communication, or the like, in addition to a local area network (LAN) communication system. Moreover, a camera for taking an image of an IP address displayed on the display of a smartphone and an audio system composed of a speaker and a microphone can also be used as communication devices, in addition to the device compliant with the NFC standards. Hereinafter, in the present specification, a device capable of exchanging information over a distance enabling audio to be sent or an image to be taken through this type of device compliant with the NFC standards and space is referred to as "NFC device" and communication between NFC devices is referred to as "NFC communication."

Japanese Patent Application Laid-Open No. 2005-18377 shows a technique in which an access point sends a broadcast frame including a magic packet or a multicast frame to a computer whose main power supply is in an off state to turn on the main power supply.

Japanese Patent Application Laid-Open No. 2008-131312 shows a technique in which a radio terminal in a doze state shifts to an awake state at the time of generating a transmission packet to reduce power consumption of a transmitter-receiver circuit.

BRIEF SUMMARY

In summary, one aspect provides an information handling device, comprising: one or more processors; a first near field communication device; a communication element; and a memory device that stores instructions executed by the one or more processors, the instructions being executable by the one or more processors to: initiate communication between the first near field communication device and a second communication device with a second near field communication device, wherein said second near field communication device is in a stopped state; the communication comprising transmitting a request from said first near field communication device to said second communication device to shift said second near field communication device to an operational state; the request shifting said second near field communication device to an operational state.

Another aspect provides a method, comprising: initiating communication between a first communication device with a first near field communication device and a second communication device with a second near field communication device, wherein said second near field communication device is in a stopped state comprising: receiving a request from said first communication device at said second communication device; after receiving the request, shifting said second near field communication device to an operational state; receiving other information from said first near field communication device at said second near field communication device; ending communication between said first near field communication and said second near field communication device; and shifting said second near field communication device to a stopped state A further aspect provides a computer program product comprising: a computer readable storage device having computer readable program code embodied therewith, the computer readable program code comprising: computer readable program code configured to initiate communication between a first communication device with a first near field communication device and a second communication device with a second near field communication device, wherein said second near field communication device is in a stopped state comprising; computer readable program code configured to receive a request from said first communication device at said second communication device; computer readable program code configured to, after receiving the request, shift said second near field communication device to an operational state; computer readable program code configured to receive other information from said first near field communication device at said second near field communication device; computer readable program code configured to end communication between said first near field communication and said second near field communication device; and computer readable program code configured to shift said second near field communication device to a stopped state.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

DETAILED DESCRIPTION

Figure 1:
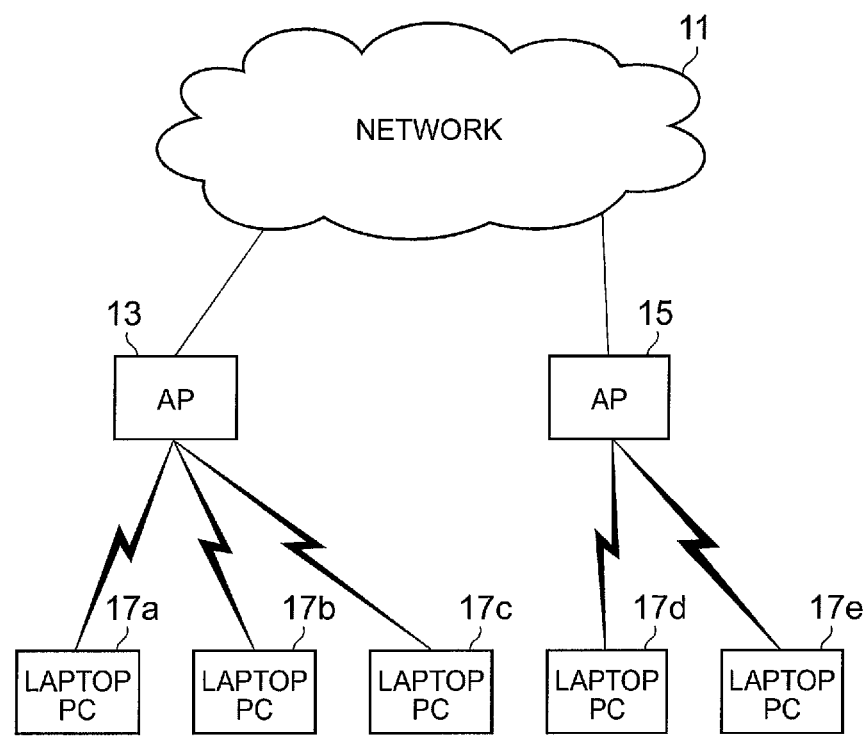
FIG. 1 shows an operating environment of a laptop PC.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In order to cause a NFC device mounted on a laptop PC to respond to a communication request issued at an unexpected time from another NFC device, the power supply of the NFC device needs to always be in an on state. A laptop PC, however, frequently operates with a battery. Therefore, a user places the power supply of a BLUETOOTH® device or an infrared device always in an off state. Moreover, from a viewpoint of privacy protection, a lot of users place the power supply of a camera or microphone always in an off state or keep the input thereof off.

Accordingly, in order to cause the laptop PC equipped with an NFC device whose power supply is in an off state to communicate with a remote NFC device, it is required to turn on the power supply of the NFC device mounted on the laptop PC in some method when communication is required. In the past, a user has had no other choice but to turn on the power supply of the NFC device manually, and therefore it has been impossible to rapidly start NFC communication. In addition, it has also been impossible to perform NFC communication with other users. Furthermore, even if a plurality of laptop PCs present in places close to each other are connected to a LAN, the laptop PCs have not been able to communicate with each other directly in the case where an IP address on the other side is unknown.

Therefore, an embodiment provides a method of communicating with a near field communication device in a stopped state mounted on an information terminal device. Another embodiment provides a method of reducing power consumption of an information terminal device equipped with a near field communication device. Still another embodiment provides a method of communicating with a near field communication device mounted on an information terminal device while securing user's privacy. Further an embodiment provides a method of acquiring an IP address from an information terminal device equipped with a near field communication device. An embodiment provides an information terminal device and a computer program for implementing these methods.

According to an embodiment, there is provided a method in which an initiator equipped with a first communication device and a first near field communication device communicates with an information terminal device equipped with a second communication device and a second near field communication device. The near field communication device includes not only a device compliant with the radio communication standards of NFC, but also a device communicating with video and audio. First, the second near field communication device is shifted to a stopped state.

The above can be considered to be an operation which a user of the information terminal device normally performs for the second near field communication device. When the initiator wants to communicate with the information terminal device through the first near field communication device and the second near field communication device, the initiator transmits a request for shifting the second near field communication device to an operating state through the first communication device and the second communication device. The information terminal device, which has received the request, shifts the second near field communication device to the operating state in response to the request and communicates with the first near field communication device.

Accordingly, while the second near field communication device is normally placed in a stopped state from a viewpoint of power saving or privacy protection, the information terminal device is able to respond to a request issued from the initiator, if the request occurs. The first communication device and the second communication device may communicate with each other through a wired LAN or a wireless LAN. The information terminal device and the initiator are normally connected to a LAN in an office or home and therefore suitable as request transmitting devices.

A frame cannot be transmitted if the IP address of the destination is unknown in the LAN. The use of a broadcast frame, however, enables the transmission of a request to all targets present in a broadcast domain. The near field communication device may be a communication system including, for example, a BLUETOOTH® device, a display device or a camera communicating with image data, a speaker or a microphone communicating with an audio signal, or the like.

Only in the case where the request includes the identifier of an access point to which the first communication device connects and where the identifier of an access point to which the second communication device connects coincides with the identifier included in the request, the second near field communication device is allowed to be shifted to the operating state. In this case, only the second near field communication device of a target connected to the same access point and present in a near place is shifted to an operating state, thus not affecting the operations of the information terminal devices connected to distant access points and unlikely to communicate with the initiator.

The request may be transmitted in a frame with the identifier of the second communication device previously registered in the initiator as a destination address. In this case, only the second near field communication device of an information terminal device with which the initiator wants to communicate is able to be shifted to the operating state without affecting the operations of other information terminal devices. When the second near field communication device searches for a presence of the first near field communication device and the second near field communication device does not detect the presence of the first near field communication device, the information terminal device is able to shift the second near field communication device to a stopped state.

Regarding the detection of the first near field communication device by the second near field communication device, either of active scanning and passive scanning may be used, where the second near field communication device inquires for the presence of any other near field communication device in the active scanning and the second near field communication device receives a signal sent from the first near field communication device in the passive scanning Accordingly, even in the case where the second communication device is shifted to an operating state once in response to a request, the second communication device is shifted to a stopped state immediately if the initiator is not present in the vicinity, thereby securing power saving and privacy.

When detecting the presence of the first near field communication device, the information terminal device is able to display an opt-in dialogue screen for inputting whether to continue the operating state of the second near field communication device in the display device. Then, the information terminal device causes the operating state of the second near field communication device to be continued in response to an affirmative input on the opt-in dialogue screen or causes the second near field communication device to be shifted to the stopped state in response to a negative input, thereby enabling the second near field communication device to be shifted to the stopped state unless the user desires communication through the second near field communication device at the time. The second near field communication device may be shifted to the operating state in response to a request only if the information terminal device sets the permission for the communication, thereby preventing a response from being sent even if a user not desiring communication receives a request from the initiator.

According to another embodiment, there is provided a method in which an information terminal device equipped with a first communication device and a first near field communication device communicates with a target equipped with a second communication device and a second near field communication device. First, the first communication device and the first near field communication device are shifted to an operating state. The information terminal device transmits a request for shifting the second near field communication device to an operating state to the target with the second near field communication device in a stopped state through the first communication device and the second communication device. The second near field communication device which has shifted to the operating state in response to the request and has detected the presence of the first near field communication device communicates with the first near field communication device. With this configuration, the information terminal device is able to communicate using the first near field communication device only by transmitting the request through the first communication device.

According to still another embodiment, there is provided a method in which an information terminal device equipped with a first near field communication device acquires an IP address from a target equipped with a second near field communication device. First, the information terminal device and the target connect to a local area network. Subsequently, the information terminal device transmits a broadcast frame including a request for shifting the second near field communication device in a stopped state to an operating state to the local area network. The second near field communication device of the target shifts to the operating state in response to the request and detects the presence of the first near field communication device. Thereafter, the information terminal device acquires an IP address of the target through the second near field communication device and the first near field communication device. With this configuration, the information terminal device and the target are able to communicate with each other through the local area network, wherein the first near field communication device of the information terminal device and the second near field communication device of the target are present within a range of being able to communicate with each other.

According to another embodiment, there is provided a method of communicating with a near field communication device in a stopped sate mounted on an information terminal device. Further, according to an embodiment, there is provided a method of reducing power consumption of the information terminal device equipped with the near field communication device. Still further, according to an embodiment, there is provided a method of communicating with the near field communication device mounted on the information terminal device while securing user's privacy. Moreover, according to an embodiment, there is provided a method of acquiring an IP address from the information terminal device equipped with the near field communication device. Furthermore, according to an embodiment, there is provided an information terminal device and a computer program which implement these methods.

FIG. 1 is a diagram illustrating an operating environment of a laptop PC which implements an embodiment. Laptop PCs 17a to 17c are connected to a network 11 via a wireless LAN through an access point (AP) 13. Moreover, the laptop PCs 17d and 17e are connected to the network 11 via a wireless LAN through an AP 15. The laptop PCs 17a to 17e are merely examples of information terminal devices in an embodiment. In alternative operating environments, one type of devices such as smartphones, tablet terminals, desktop PCs, or smart televisions or a plurality of types of devices may be used. The laptop PCs 17a to 17e are equipped with NFC devices capable of performing an NFC communication with each other. In the NFC communication, one of the laptop PCs is an initiator and remaining other laptop PCs are targets.

Figure 2A:
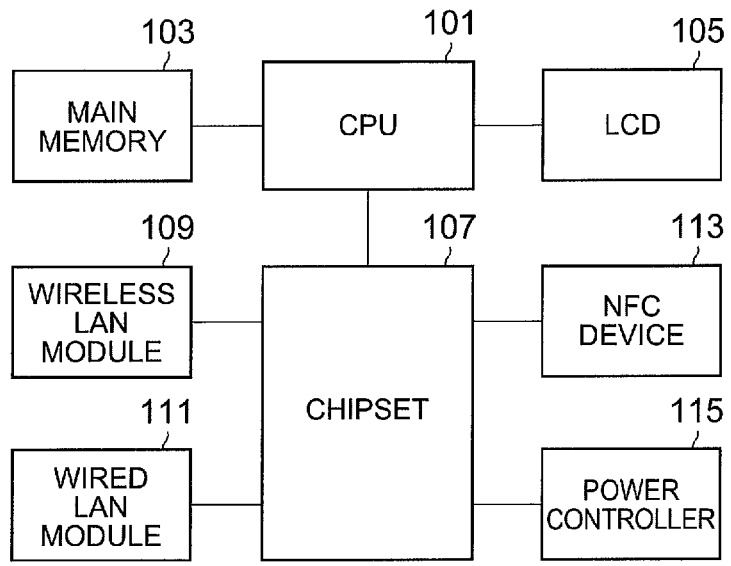
FIG. 2(A-B) is a functional block diagram illustrating the configuration of the laptop PC.
Figure 2B:
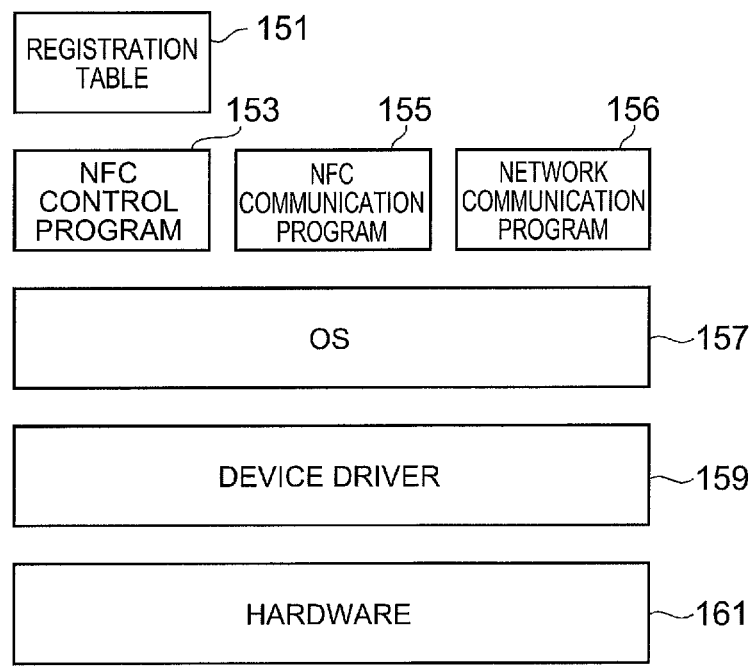

FIG. 2(A-B) is a functional block diagram illustrating the schematic configuration of each of the laptop PCs 17a to 17e. FIG. 2A illustrates a hardware configuration and FIG. 2B illustrates a software configuration. In FIG. 2A, a chipset 107 is connected to a CPU 101, a wireless LAN module 109, a wired LAN module 111, an NFC device 113, and a power controller 115. The CPU 101 is connected to a main memory 103 and an LCD 105.

The wireless LAN module 109 and the wired LAN module 111 operate at the network interface layer of the TCP/IP protocol layered model in order to connect to the network 11. The NFC device 113 may include, for example, one or more of a BLUETOOTH® module, an infrared module, an RFID module, an audio system including a speaker and a microphone, and a photographic system including a display and a camera. The power controller 115 controls the electric power of the NFC device 113 and the entire laptop PC.

In FIG. 2B, the software includes a device driver 159 which controls hardware 161, an OS 157, an NFC control program 153 which runs on the OS, an NFC communication program 155, and a network communication program 156. A registration table 151 is used to register, for example, an identifier of a laptop PC belonging to a group which performs the NFC communication, an identifier of an NFC device mounted on a laptop PC, and a passcode which is required for BLUETOOTH®. The identifier may be, for example, a MAC address. The NFC control program 153 is an application program which performs control for the laptop PC 17 to perform the NFC communication. The NFC control program 153 runs at the application layer of the TCP/IP protocol layered model and a given port number is assigned to the NFC control program 153 in advance.

The NFC control program 153 accesses the registration table 151 to cause the laptop PCs 17a to 17e to operate each as an initiator or a target. The NFC communication program 155 is an application program for use in communicating with another laptop PC through the NFC device 113. The network communication program 156 is an application program for use in communicating with another laptop PC via the network 11 through the wireless LAN module 109 or the wired LAN module 111.

Figure 3:
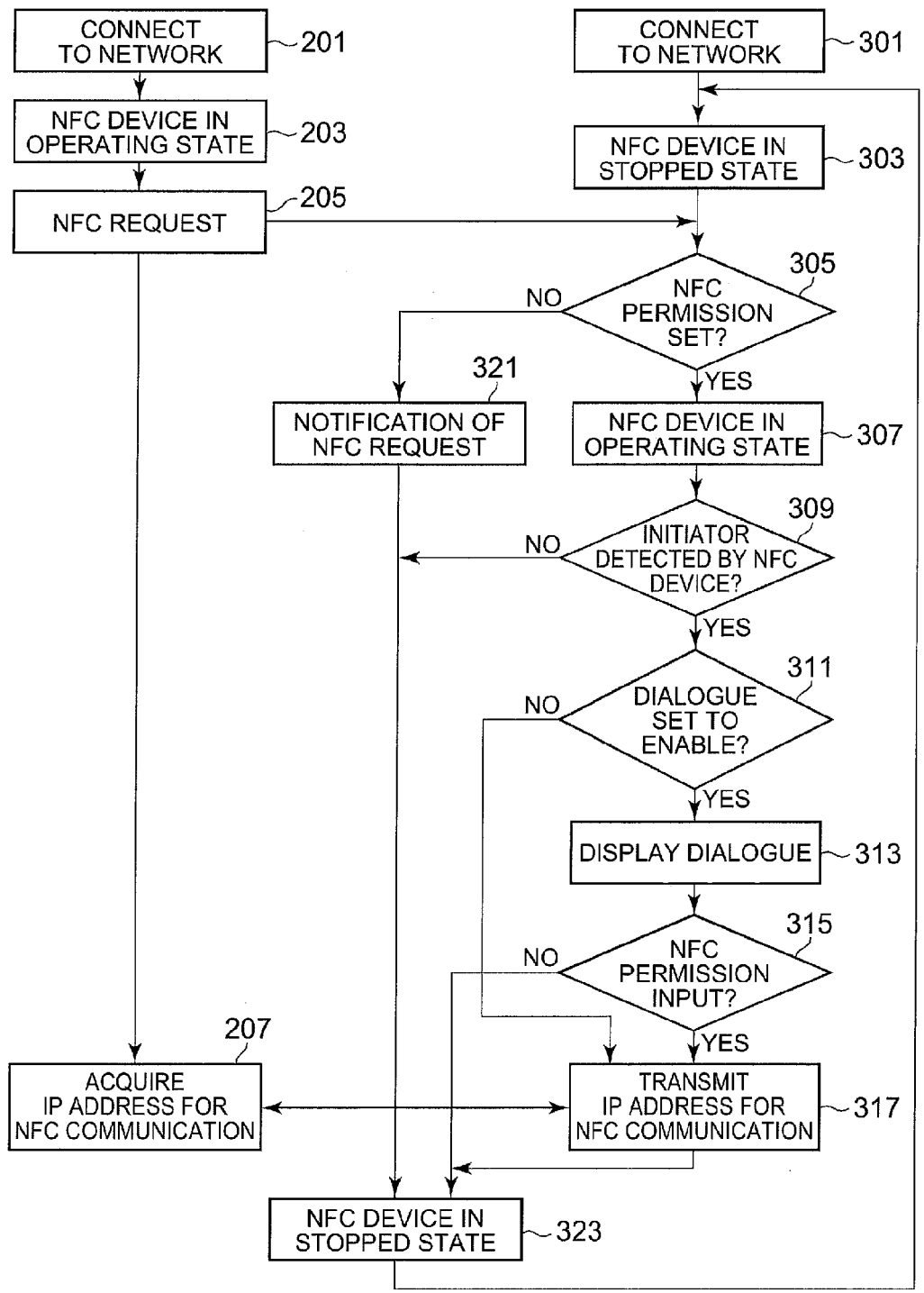
FIG. 3 is a flowchart illustrating a procedure in which an initiator performs an NFC communication with a target.

FIG. 3 is a flowchart illustrating a procedure in which an initiator performs an NFC communication with a target. Each of the laptop PCs 17a to 17e has the configuration illustrated in FIG. 2, which enables any one of the laptop PCs to be an initiator and remaining laptop PCs to be targets. In this specification, an embodiment is described by giving an example of a case where the laptop PC 17a is an initiator. In addition, "I" is appended to the reference numeral of the initiator illustrated in FIG. 2 and "T" is appended to the reference numeral of the target to distinguish between the initiator and the target. Blocks 201 to 207 represent the operating procedure of the initiator and blocks 301 to 323 represent the operating procedure of the target. The user of the initiator and the user of the target may be the same as each other or different from each other.

Figure 4:
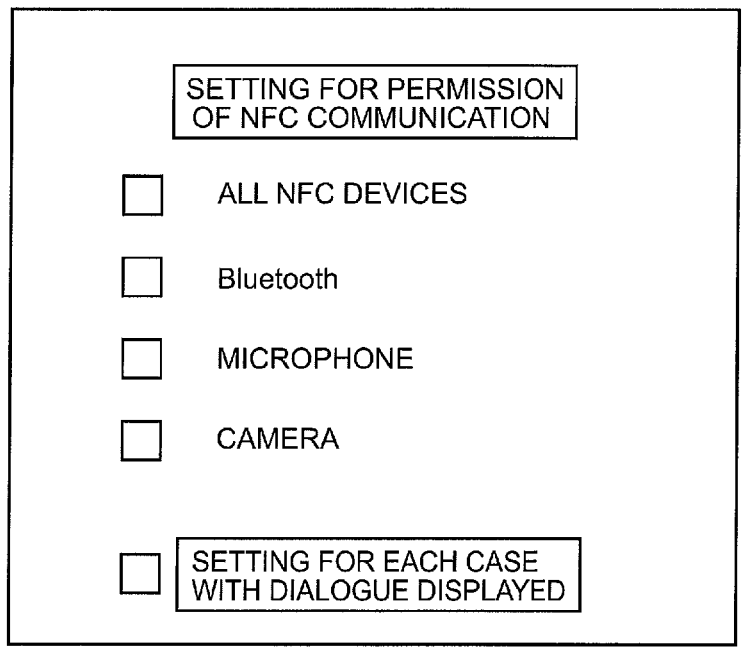
FIG. 4 shows an example of a configuration screen for setting a response method when receiving an NFC request.

In blocks 201 and 301, all of the laptop PCs 17a to 17e are placed in the power-on state and connected to the network 11 through the wireless LAN modules 109I and 109T. In block 301, the user of the target executes an NFC control program 153T to set a response method which is to be implemented when receiving an NFC request from the initiator. The NFC request herein means a request for the initiator to place the NFC device of the target in an operating state at the beginning by using a method other than the NFC device. FIG. 4 illustrates an example of a configuration screen for this situation. On the configuration screen, whether or not to permit the NFC communication is able to be set for each NFC device 113T if each laptop PC is equipped with one or more NFC devices 113T. The result of the setting is stored in the registration table 151.

The target does not perform NFC communication in response to a request from the initiator with respect to the NFC device 113T for which the NFC communication is not permitted. For example, if one user does not permit the NFC communication of a camera and a microphone while permitting only a BLUETOOTH® device, the user sets the checkbox therefor. Moreover, on the configuration screen, it is also possible to set whether to permit the NFC communication for each case with an opt-in dialogue screen displayed when receiving an NFC request. If the setting is made to display the opt-in dialogue screen, the setting for each NFC device 113 becomes invalid. Although the NFC device 113T used for the current NFC communication of the initiator is in the operating state in block 203, the operation of the corresponding NFC device 113T of the target is stopped in block 303 for the following reasons.

If the NFC device 113T is a BLUETOOTH® module or an infrared module, a user stops the power supply of the NFC device 113T through the power controller 115T from a viewpoint of power consumption. If the NFC device 113T is a photographic system, the user stops the camera input from a viewpoint of privacy protection. If the NFC device 113T is an audio system, the user stops the microphone input from a viewpoint of power consumption and privacy protection. Hereinafter, a state of the NFC device 113T where the power is on and the input is set to enable is referred to as "operating state" and a state of the NFC device 113T where the power is off and the input is set to disable is referred to as "stopped state."

To perform the NFC communication, both of the NFC device 113I of the initiator and the NFC device 113T of the target with which the initiator wants to communicate need to be placed in the operating state. A method in which the initiator user or the target user manually places the NFC device 113T with which the user wants to perform NFC communication is not used here since the operation is complicated or the user may be different. Therefore, the initiator places the NFC device 113T of the target with which the initiator user wants to perform NFC communication in the operating state in a method described below.

The initiator does not know the current IP address used by the target to connect to the network 11 and therefore is not able to send a request for placing the NFC device 113T in the operating state to the target with which the initiator wants to perform the NFC communication directly on the network 11. If the initiator knows the e-mail address of the target, the initiator is able to issue the request for placing the NFC device 113T in the operating state via the network 11 by means of a mail server. It, however, requires time for executing a mailer and inputting the address of the destination. Moreover, acquisition of the request by the target from a mail box also requires time and the operation in which the target user processes the request is complicated. Therefore, the method is not adopted either.

In block 205, the initiator user executes an NFC control program 153I with a simple operation to issue an NFC request. The simple operation may be an operation not accompanied by an input from a touch screen such as, for example, if the initiator is a smartphone, swinging the smartphone with a given gesture or giving a slight shock more than once. Moreover, if the initiator is a laptop PC, the simple operation may be an icon operation not accompanied by an input of a given combination key or a change in the current display screen. The NFC device 113I to be used by the initiator for the NFC communication may be selected by a simple operation or may be set in the registration table 151 in advance.

The executed NFC control program 153 generates a broadcast frame which is received by all targets present in the same broadcast domain from the wireless LAN module 109 by referring to the registration table 151 and transmits an NFC request to the network 11. The NFC control program 153 may cause a transmission of a multicast frame which is received by a grouped target, instead of the broadcast frame. Although an OS, a device driver, and a BIOS intervene in data transfer between the NFC control program 153, the NFC communication program 155, or the network communication program 156 and hardware, they are already known and therefore the description thereof is omitted here.

A TCP payload (user data) constituting the TCP packet of the broadcast frame may include an NFC flag indicating a request for NFC communication, an identifier of the NFC device 113I requiring communication, and a passcode as needed. Moreover, the NFC control program 153I may allow the user data to include BSSID of the currently connected AP 13 which is acquired from the wireless LAN module 109I. The NFC control programs 153T of all targets analyze the user data after receiving the NFC request.

The target which has recognized the NFC flag in block 305 checks the identifier of the NFC device and determines whether to permit the NFC communication by the corresponding NFC device with reference to the registration table 151T. If the NFC communication is set to be permitted for the NFC device requested from the initiator or the opt-in dialogue screen is set to be displayed in block 301, the processing proceeds to block 307. Otherwise, the processing proceeds to block 321. In this regard, in order to achieve a success in the NFC communication between the initiator and the desired target, preferably all targets make settings for permitting the NFC communication in advance so that the processing is able to proceeds to block 309.

Meanwhile, the user of each target does not want to shift the NFC device 113T to the operating state if the target is other than one requested by the initiator. Therefore, preferably the target, which has received an NFC request in a broadcast frame, shifts the NFC device 113T to an operating state only in the case where the target is likely to be the other party of the NFC communication as much as possible. Laptop PCs likely to be the other parties of the NFC communication among the laptop PCs 17b to 17e are laptop PCs present within a range of being able to perform near field communication appropriate to the performance of the NFC devices 113I and 113T.

Therefore, the NFC control program 153T of each target is allowed to acquire the BSSIDs of the currently connected APs 13 and 15 from the wireless LAN module 109 and to compare the BSSIDs with the BSSID of the AP 13 included in the user data of the broadcast frame. If the BSSIDs match each other, it is determined that the target is likely to be the other party of the NFC communication since the target is connected to the same AP 13 and the processing proceeds to block 307. Otherwise, the target is connected to the different AP 15 and therefore it is determined that the target is unlikely to perform the near field communication with the initiator and the processing proceeds to block 321.

In block 307, the NFC control program 153T of each target instructs the power controller 115T to power on the NFC device 113T or sets the input of the NFC device 113T to enable to shift the NFC device 113T to the operating state. In block 321, the NFC control program 153T of a target which does not shift the NFC device 113T to the operating state displays a dialogue screen to inform a user that the NFC request is received. The dialogue screen provides the user with an opportunity for changing the settings made in block 301 after block 301.

The NFC device 113T shifted to the operating state searches for an initiator which is going to start NFC communication in the vicinity in block 309. If the NFC device 113I required by the NFC request is a BLUETOOTH® device, the target searches for a BLUETOOTH® device present in the vicinity. The NFC control program 153T of the target proceeds to block 311 if having detected an identifier coinciding with the identifier of the BLUETOOTH® device included in the NFC request or proceeds to block 323 unless having detected the identifier in spite of searching for the identifier for a given period of time.

If the NFC device 113T required by the NFC request is a microphone, the NFC control program 153T determines whether a given audio signal has been received through the microphone and the NFC communication program 155T. If the audio signal has been received, the processing proceeds to block 311. Otherwise, the processing proceeds to block 323. If the NFC device 113T required by the NFC request is a camera, the NFC control program 153T determines whether a given image has been taken through the camera and the NFC communication program 155T. If the image has been taken, the processing proceeds to block 311. Otherwise, the processing proceeds to block 323.

In block 311, the processing proceeds to block 313 if the display of the opt-in dialogue screen is set to enable in block 301 or proceeds to block 317 if the display of the opt-in dialogue screen is set to disable. In block 313, the target displays the opt-in dialogue screen on the LCD 105T. The opt-in dialogue screen includes the type of the NFC device 113T requested for the NFC communication, a checkbox for use in determining whether or not to permit the NFC communication, and the like.

Processing proceeds to block 317 if the user inputs permission in block 315 or proceeds to block 323 if the user inputs non-permission. In blocks 207 and 317, the NFC communication programs 155I and 155T communicate with the initiator through the NFC devices 113I and 113T. In this regard, if the NFC device 113I is a BLUETOOTH® device, the NFC control program 153I sets the BLUETOOTH ® device to a detectable state and the NFC control program 153T is able to establish the communication by sending a passcode which has been received in the NFC request to the NFC control program 153I.

In the NFC communication, the NFC control program 153I is able to request the MAC address and the current IP address from the target through the NFC communication program 155I. The NFC control program 153I passes the MAC address and the IP address acquired from the target to the network communication program 156I. Thereafter, the network communication program 156I is allowed to communicate with the network communication program 156T in a unicast frame with the received MAC address and IP address as destinations. Immediately after the NFC communication program 155T terminates the communication, the NFC control program 153T instructs the power controller 115T or the NFC device 113T to shift the NFC device 113T to a stopped state in block 323.

According to the above procedure, the initiator is able to start the NFC communication in block 207 if a respondent target is present only by transmitting an NFC request in block 205, and therefore the operation is easy. Moreover, the target user is able to automatically respond to NFC communication only by setting an affirmative or negative response in advance and is able to set the NFC device 113T to a stopped state in the case where an initiator is not present or where an input is made on the opt-in dialogue screen even after the NFC device 113T is shifted to an operating state once, thereby enabling the power saving and privacy to be secured.

Although there has been given an example in which the initiator is not associated with the target beforehand, an embodiment also allows the initiator and the target to be associated with each other in advance. For example, a group of laptop PCs which will perform NFC communication mutually exchange MAC addresses and store the MAC addresses in the registration table 151 beforehand. The destination address of an ETHERNET® header to which the NFC request is sent in block 205 is considered to be the MAC address registered in the registration table 151 and the destination address of the IP header is considered to be the broadcast IP address. The user data previously includes the NFC flag, the identifier of the NFC device, the MAC address of the initiator, and the passcode.

The NFC control program 153T of the target, which has received the NFC request, shifts the NFC device 113T to the operating state if the MAC address of the initiator is an MAC address registered in the registration table 151. Associating the initiator with the target beforehand prevents the NFC devices 113T of all targets which do not perform NFC communication from being shifted to the operating state. Although the description has been made by giving an example of transmitting the NFC request via the wireless LAN, an embodiment is not limited thereto, but the wired LAN module 111 may be used or any other always-on network may be used, too.

While an embodiment has been described by using particular embodiments illustrated in the accompanying drawings, an embodiment is not limited to the embodiments illustrated in the drawings, and naturally any conventionally known configuration may be used as long as the effect of an embodiment is achieved.

What is claimed is:

1. An information handling device, comprising:
one or more processors;
a first near field communication device;
a communication element; and
a memory device that stores instructions executed by the one or more processors, the instructions being executable by the one or more processors to:
initiate communication between the information handling device and a second device with a second near field communication device, wherein said second near field communication device is in a stopped state;
the initiating comprising transmitting a request from said information handling device to said second device via a local area network to shift said second near field communication device to an operational state.

2. The information handling device of claim 1, wherein the instructions are further executable by the one or more processors to transmit desired information between said first near field communication device and said second near field communication device.

3. The information handling device of claim 1, wherein the request has an identifier previously registered as the destination address.

4. The information handling device of claim 3, wherein the request is transmitted in a broadcast frame, and includes the identification of an access point.

5. The information handling device of claim 4, wherein the shifting is performed only if an access point to which the second device is connected matches the access point of the request.

6. A method, comprising:
initiating communication between a first device with a first near field communication device and a second device with a second near field communication device, wherein said second near field communication device is in a stopped state, said initiating comprising:
sending a request from said first device at said second device via a local area network; and
sending other information from said first near field communication device at said second near field communication device; and
ending communication between said first near field communication and said second near field communication device.

7. The method of claim 6, wherein at least one of said first device and second device are wirelessly connected to the local area network.

8. The method of claim 6, wherein the request is sent in a broadcast frame.

9. The method of claim 8, wherein the request sent in the broadcast frame has an identifier of said second device previously registered.

10. The method of claim 6, wherein the request includes identification of an access point.

11. The method of claim 10, wherein the second near field communication device shifts into an operational state in response to the request, and wherein the shift is performed only if an access point to which the second device is connected matches the access point of the request.

12. The method of claim 6, further comprising displaying an opt-in dialogue screen for inputting whether to continue the operational state of said second near field communication device.

13. The method of claim 6, wherein said second near field communication device shifts to a stopped state upon failing to detect said first near field communication device.

14. The method of claim 6, wherein the first device and the second device communicate over a wireless local area network.

15. The method of claim 14, wherein the first device communicates a request including an identifier or an access point to which the first devices has connected.

16. The method of claim 15, wherein said second near field communication devices is shifted from the stopped state to an operating state if the identifier matches an access point identifier to which the second device has connected.

17. The method of claim 16, wherein the first device and the second device are not near field communication devices.

18. A computer program product comprising:
a non-signal computer readable storage device having computer readable program code embodied therewith, the computer readable program code being executable by a processor and comprising:
computer readable program code that initiates communication between a first device with a first near field communication device and a second device with a second near field communication device, wherein said second near field communication device is in a stopped state, said initiating comprising:
sending a request from said first device to said second device via a local area network;
wherein, responsive to receiving the request, said second device shifts said second near field communication device to an operational state;
computer readable program code that sends other information from said first near field communication device to said second near field communication device; and
computer readable program code that ends communication between said first near field communication and said second near field communication device.

* * * * *